(12) United States Patent
Chang et al.

(10) Patent No.: US 10,078,538 B2
(45) Date of Patent: Sep. 18, 2018

(54) WEB APPLICATION INTEGRATION WITH DIALOGUE BASED SCRIPTS

(75) Inventors: Belinda Y Chang, Durham, NC (US); John R. Hind, Raleigh, NC (US); Robert E. Moore, Durham, NC (US); Brad B. Topol, Cary, NC (US); Jie Xing, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2186 days.

(21) Appl. No.: 11/380,609

(22) Filed: Apr. 27, 2006

(65) Prior Publication Data

US 2007/0260670 A1 Nov. 8, 2007

(51) Int. Cl.
*G06F 15/16* (2006.01)
*G06F 9/54* (2006.01)

(52) U.S. Cl.
CPC ............. *G06F 9/542* (2013.01); *G06F 9/541* (2013.01)

(58) Field of Classification Search
USPC .................................. 709/227, 246; 717/115
See application file for complete search history.

(56) References Cited

U.S. PATENT DOCUMENTS

| | | | | |
|---|---|---|---|---|
| 5,754,830 A | * | 5/1998 | Butts et al. | 719/311 |
| 5,892,905 A | * | 4/1999 | Brandt | H04L 63/02 709/202 |
| 5,898,835 A | * | 4/1999 | Truong | 709/217 |
| 6,012,098 A | * | 1/2000 | Bayeh et al. | 709/246 |
| 6,023,714 A | * | 2/2000 | Hill et al. | 715/235 |
| 6,594,700 B1 | * | 7/2003 | Graham et al. | 709/230 |
| 6,662,241 B1 | * | 12/2003 | Bauer et al. | 710/8 |
| 6,968,539 B1 | * | 11/2005 | Huang et al. | 717/115 |
| 7,143,437 B2 | * | 11/2006 | Royer et al. | 726/8 |
| 7,228,499 B1 | * | 6/2007 | Taira | 715/207 |
| 7,356,606 B2 | * | 4/2008 | Choate | 709/232 |
| 7,404,148 B2 | * | 7/2008 | Lincke et al. | 715/805 |
| 2001/0005852 A1 | | 6/2001 | Bogle et al. | |

(Continued)

OTHER PUBLICATIONS

"Auto-page on Demand" [Retreived online on Dec. 18, 2008] Jul. 6, 1989. [Retreived from the internet] <URL: http://linac.fnal.gov/LINAC/software/locsys/pdfFiles/SystemCodePDF/Misc/AutoPageOnDemand.pdf>.*

(Continued)

*Primary Examiner* — Mohamed A Wasel
*Assistant Examiner* — Tsung Yin Wu
(74) *Attorney, Agent, or Firm* — Steven M. Greenberg, Esq.; CRGO Law

(57) ABSTRACT

Embodiments of the present invention address deficiencies of the art in respect to scripting integration in a Web application environment and provide a method, system and computer program product for Web application integration with dialog based scripts. In one embodiment of the invention, a method for integrating a Web application with dialog-based script input can be provided. The method can include receiving a script input request from an executing script; formatting the script input request from the executing script into a Web form for a Web page and providing the Web page to a content browser; receiving form input in the Web form in the Web page from the content browser and transforming the form input into script input for the executing script; and, providing the script input to the executing script.

7 Claims, 2 Drawing Sheets

(56) References Cited

U.S. PATENT DOCUMENTS

| | | | |
|---|---|---|---|
| 2001/0032273 A1* | 10/2001 | Cheng | H04L 12/2805 709/249 |
| 2002/0041289 A1 | 4/2002 | Hatch et al. | |
| 2002/0059325 A1 | 5/2002 | Biezer et al. | |
| 2002/0083030 A1* | 6/2002 | Yang | G06F 17/30575 |
| 2002/0122054 A1* | 9/2002 | Hind | G06F 17/30896 715/731 |
| 2002/0129153 A1* | 9/2002 | Fleming | 709/230 |
| 2004/0044652 A1* | 3/2004 | Ito | 707/3 |
| 2004/0044961 A1* | 3/2004 | Pesenson | 715/513 |
| 2004/0201604 A1* | 10/2004 | Kraenzel | G06Q 10/10 715/700 |
| 2004/0205731 A1* | 10/2004 | Junkermann | G06F 9/4488 717/136 |
| 2005/0198394 A1* | 9/2005 | Waldorf et al. | 709/246 |
| 2006/0031750 A1* | 2/2006 | Waldorf et al. | 715/501.1 |
| 2007/0220015 A1* | 9/2007 | Fleming | 707/10 |
| 2008/0071916 A1* | 3/2008 | Lee et al. | 709/229 |

OTHER PUBLICATIONS

"Auto-page on Demand" [Retreived online on Dec. 18, 2008] Jul. 06, 1989. [Retreived from the internet] <URL: http://linac.fnal.gov/LINAC/software/locsys/pdfFiles/SystemCodePDF/Misc/AutoPageOnDemand.pdf>.*

* cited by examiner

WEB APPLICATION INTEGRATION WITH DIALOGUE BASED SCRIPTS

BACKGROUND OF THE INVENTION

Field of the Invention

The present invention relates to the field of script processing in a server environment and more particularly to script processing in a Web application environment.

Description of the Related Art

Script processing relates to the automated execution of commands in an operating environment and dates from the earliest of personal computers. Initial forms of scripting include UNIX environment shell scripts and DOS based batch files. In both cases, the intent of a script was to automate a manual process ordinarily performed by a computing professional, and in some circumstances, to reduce the possibility of error by hard coding operating commands within a script. Whereas scripting initially related solely to the automation of operating environment commands, scripting since has become more widely used in many diverse circumstances aside from mere command automation.

In this regard, modern day scripting provides a robust programming environment that cannot be distinguished from many traditional programming environments. In particular, modern scripting languages permit full interaction with computing users and provide a full range of conditional branching and computational functionality. More recently, scripting languages even support concepts in object-oriented development such that many developers opt for scripting languages over third generation languages due to inherent simplicity of use and powerful command set not necessarily available in many programming environments.

Scripting languages have formed part and parcel of the interactive Web for more than a decade. In fact, the common gateway interface (CGI) and later the practical extraction and reporting language (PERL) scripting environments provided the computational backend for Web interfaces throughout the latter portion of the twentieth century. With both CGI and PERL, input provided by a Web page could be processed within a script defined in CGI or PERL and the result could be provided in another Web page. In both CGI and PERL, however, the Web application usually would have been singular purposed and tightly coupled to the underlying script so as to be able to provide an effective front end for the computational output produced by the script.

The traditional integration of scripts and the Web interface does not allow loose coupling and independent operation. Specifically, unless the Web interface expects output produced by a script, the Web interface will not seek to render a user interface for the output. Conversely, unless the Web interface expects to provide input to an independently executing script, the Web interface will not prompt a user to provide the input. As a result, scripts do not integrate well with independently executing Web applications.

In an independently executing Web application, the Web application accepts input via a Web interface and receives processing on the input from server side logic executing within a Web application container. Output from the Web application can be dynamically rendered through the Web interface so as to provide all of the functionality of a stand-alone application in a distributed environment. Notwithstanding, the logic executing in the server is not script logic and, as such, lacks some of the simplicity and power associated with conventional scripting. Yet, Web applications inherently lack support for dialogue based scripting.

BRIEF SUMMARY OF THE INVENTION

Embodiments of the present invention address deficiencies of the art in respect to scripting integration in a Web application environment and provide a novel and non-obvious method, system and computer program product for Web application integration with dialogue based scripts. In one embodiment of the invention, a method for integrating a Web application with dialogue-based script input can be provided. The method can include receiving a script input request from an executing script; formatting the script input request from the executing script into a Web form for a Web page and providing the Web page to a content browser; receiving form input in the Web form in the Web page from the content browser and transforming the form input into script input for the executing script; and, providing the script input to the executing script.

In one aspect of the embodiment, the method also can include further receiving script status information from the executing script; and, providing the script status information in a portion of a polling Web page. In another aspect of the invention, formatting the script input request from the executing script into a Web form for a Web page and providing the Web page to a content browser can include setting an autopage update feature of the Web page; serving the Web page to a content browser; and, responsive to receiving an autopage update from the Web page subsequent to receiving a script input request from the executing script, formatting the script input request into a Web form for the Web page, disabling the autopage update feature of the Web page, and reserving the Web page to the content browser.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for Web application integration with dialogue-based scripts. In accordance with an embodiment of the present invention, a common script interface can mediate requests for script input from an executing script and provide those requests in a timely manner to a subscribing Web interface. The common script interface further can provide script input received from a subscribing Web interface to an executing script in a format suitable for processing by the executing script. Finally, the common script interface can provide script status information received from an executing script to a subscribing Web interface. In this way, the executing script and Web interface can interact seamlessly through a script input dialogue without requiring a close coupling of the Web interface and executing script.

Figure 1:
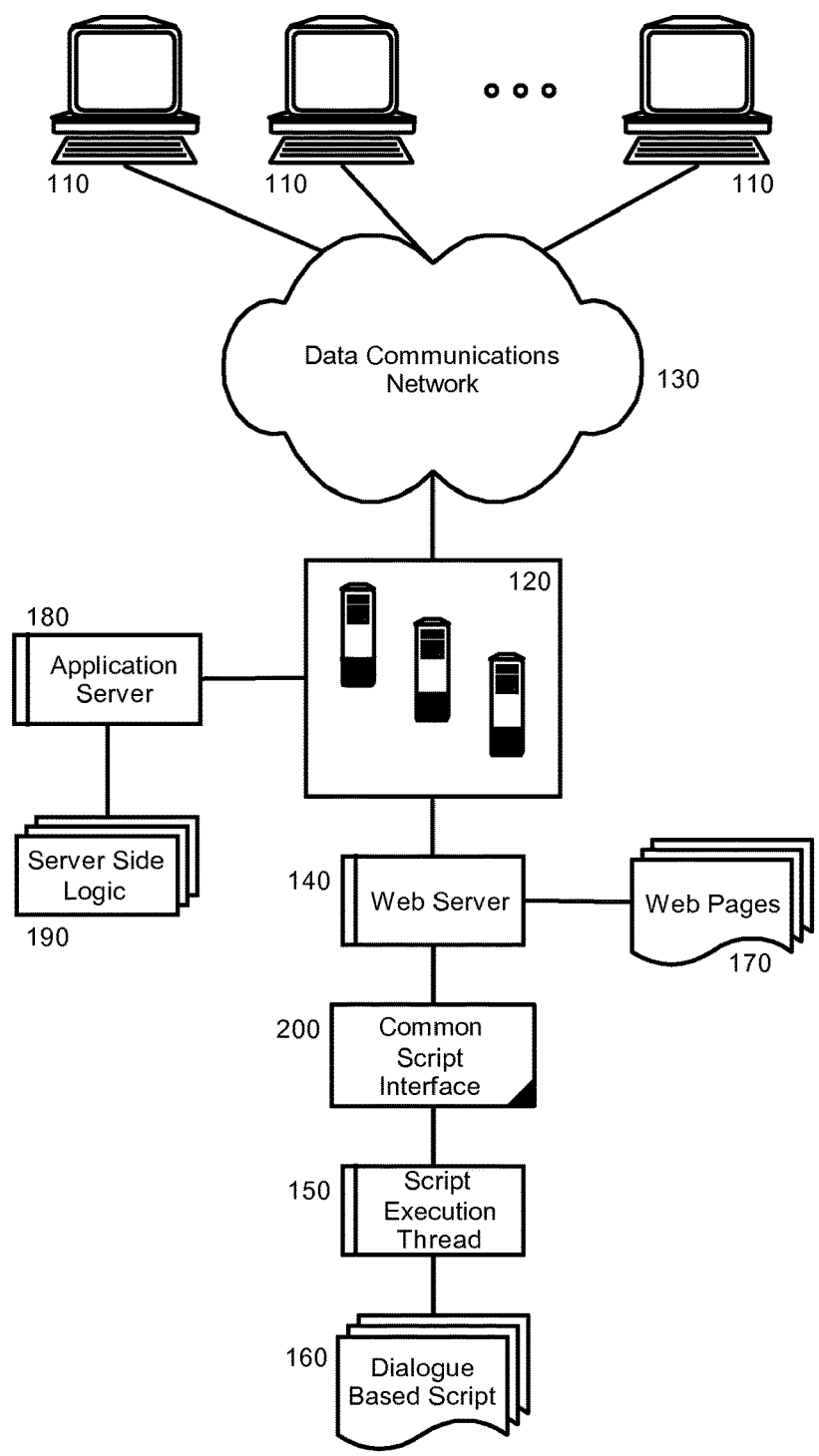
FIG. 1 is a schematic illustration of a Web application environment configured for integration with dialog based scripts.

In further illustration, FIG. 1 is a schematic illustration of a Web application environment configured for integration with dialog based scripts. The Web application environment can include one or more host computing platforms 120 hosting a Web server 140 in addition to an application server 180. The Web server 140 can be configured to serve Web pages 170 to one or more requesting client computing devices 110 over a data communications network 130. The application server 180, in turn, can support the execution of server side logic 190 such that the Web pages 170 and server side logic 190 can combine to realize a Web application including a Web interface.

Notably, a common script interface 200 can be coupled to each of the Web server 140 and a script execution thread 150 enabled to host the execution of one or more dialogue based scripts 160. In this regard, the common script interface 200 can mediate requests for script input from the dialogue based scripts 160 and can provide those requests in a timely manner to the Web pages 170 in the Web server 140. The common script interface 200 further can provide input received from the Web pages 170 to the dialogue based scripts 160 in a format suitable for processing by the scripts 160. Finally, the common script interface 200 can provide status information for the scripts 160 to subscribing ones of the Web pages 170 in the Web server 140.

Figure 2:
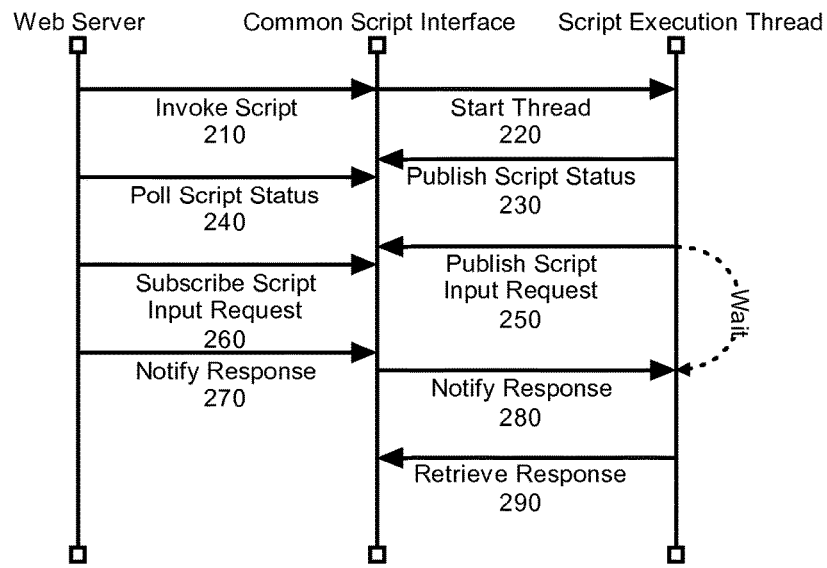
FIG. 2 is an event diagram illustrating a process for integrating a Web application with dialogue-based scripts; and, FIG. 3 is a flow chart illustrating a process for integrating a Web application with dialogue based scripts.

In further illustration of the operation of the common script interface 200, FIG. 2 is an event diagram illustrating a process for integrating a Web application with dialogue-based scripts. Initially, the Web server can invoke a script in step 210. In step 220, the common script interface can issue a command to start the script execution thread for supporting the execution of the script. In step 230, the status of the script can be published to the common script interface. Thereafter, in step 240 the Web server can poll the common script interface for the script status such that the Web server can receive the script status for rendering in a Web page without directly requesting the script status from the script.

The common script interface further can provide an intermediary for processing script input from a Web page in the Web server. In particular, in step 250 the script execution thread can publish a script input request for an executing dialogue based script. Thereafter, the script execution thread can await a response from the common script interface. In step 260 the Web server can subscribe for the script input request, re-format the request into Web content, and serve the content to a designated content browser.

In step 270 the Web server can receive the responsive script input from the content browser. Once the response has been received from the content browser, the Web server can provide the response to the common script interface without regard to the precise format expected by the script. In particular, in step 280, the common script interface can transform the form input into a format expected by the script and can notify the script of the response. Finally, in step 290 the script can retrieve the response from the common script interface.

Figure 3:
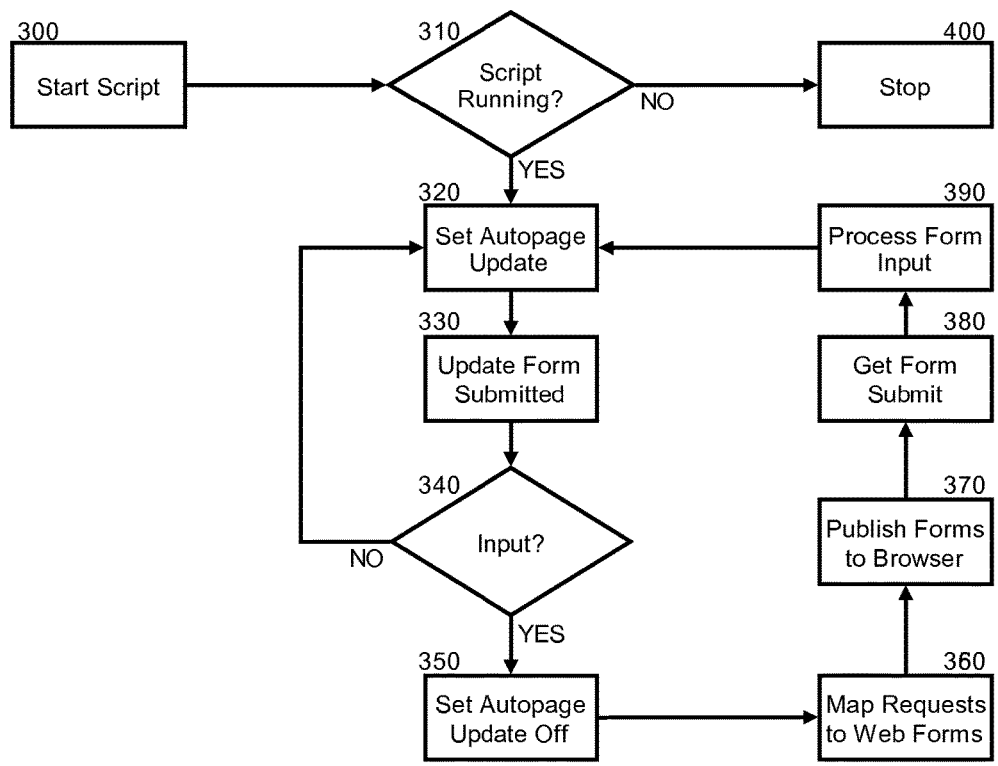

It will be recognized by the skilled artisan, that in order for a Web browser to receive the updated status of an executing script, or a request for script input, the content within the Web browser must be refreshed through a manual reloading from the Web server. As such, to more fully automate the process, an automated Web page update routine can be provided in order to alleviate the requirement of manual intervention when integrating a Web application with a dialogue based script. The automated routine can be deployed centrally in the Web server, or in a distributed manner within a Web page. In either circumstance, FIG. 3 is a flow chart illustrating a process for integrating a Web application with dialogue based scripts utilizing automated Web page updates.

Beginning in block 300, the script can be started and in decision block 310, it can be confirmed whether or not the script is running. If not the process can end in block 400. Otherwise, in block 320, the Web page linked to the executing script can be set for autopage updates and served to an associated content browser. In block 330, the Web page can autopage update and in decision block 340, it can be determined whether script input has been requested. If so, in block 350 the autopage update feature can be disabled and in block 360, the script input request can be mapped to fields in a Web form.

In block 370, the Web form can be served to the content browser and in block 380, a resulting form submit can be received from the content browser indicating that an end user has provided the solicited script input through the Web page. Thereafter, in block 390, the script input in the Web form can be processed and transformed for use by the executing script and provided to the executing script as script input. Subsequently the autopage update feature of the Web page can be re-enabled in block 320 and the process can repeat.

It will be understood that in consequence of the inventive arrangements, the input requirements of an executing script can be seamlessly integrated with the interface provided by a Web application with a minimal amount of manual intervention. Likewise, script output can be monitored within a Web page of a Web application without requiring substantial manual intervention. Both can be enabled through the intermediate deployment of a common script interface as described herein.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for integrating a Web application with dialogue-based script input, the method comprising:
   executing a common script interface by a processor of a computer the common script interface issuing a command to start a script execution thread for supporting execution of a script, receiving publication of a status of the executing script and providing the published status to a Web server when the Web server polls the common script interface for the status of the executing script; and,
   receiving a script input request by the common script interface from the executing script in a Web page and also receiving by the common script interface a subscription to the script input request from the Web server,
   the subscription by the Web server causing the Web server to perform formatting of the script input request from the executing script into a Web form for the Web page by mapping the script input request to fields in the Web form, and providing the Web page to a content browser;
   the common script interface thereafter providing an intermediary for processing script input from the Web page in the Web server by:
   receiving form input in the Web form in the Web page from the content browser via the Web server without regard to a format expected by the executing script;
   transforming the form input into script input in the format expected by the executing script;
   providing the script input to the executing script;
   setting an autopage update feature of the Web page;
   serving the Web page to the content browser; and,
   responsive to receiving an autopage update from the Web page subsequent to receiving the script input request from the executing script, formatting the script input request into the Web form for the Web page, disabling the autopage update feature of the Web page, and reserving the Web page to the content browser.

2. The method of claim 1, further comprising:
   further receiving script status information from the executing script; and,
   providing the script status information in a portion of a polling Web page.

3. A data processing system for integrating a Web application with dialogue-based script input, the system comprising:
   a computer with at least one processor and memory;
   a Web server;
   a script execution thread supporting at least one dialogue based script; and,
   a common script interface executing in the computer and disposed between the Web server and the script execution thread, the common script interface comprising program code enabled during execution in the computer to
   issue a command to start the script execution thread, receive publication of a status of the executing script and provide the published status to the Web server when the Web server polls the common script interface for the status of the executing script; and
   receive a script input request from an executing dialogue based script in a Web page and also receiving a subscription to the script input request from the Web server;
   the subscription by the Web server causing the Web server to perform formatting of the script input request from the executing dialogue based script into a Web form for the Web page by mapping the script input request to fields in the Web form, and providing the Web page to a content browser;
   the common script interface thereafter providing an intermediary for processing script input from the Web page in the Web server by:
   receiving form input in the Web form in the Web page from the content browser via the Web server without regard to a format expected by the executing script;
   transforming the form input into script input in the format expected by the executing dialogue based script;
   providing the script input to the executing dialogue based script;
   setting an autopage update feature of the Web page;
   serving the Web page to the content browser; and,
   responsive to receiving an autopage update from the Web page subsequent to receiving the script input request from the executing script, formatting the script input request into the Web form for the Web page, disabling the autopage update feature of the Web page, and reserving the Web page to the content browser.

4. The system of claim 3, further comprising an application server coupled to the Web server.

5. The system of claim 3, wherein the common script interface is further configured to:
   further receive script status information from the executing script; and,
   provide the script status information in a portion of a polling Web page.

6. A computer program product comprising a non-transitory computer usable storage medium embodying computer usable program code for integrating a Web application with dialogue-based script input, the computer program product including:
   computer usable program code for executing a common script interface by a processor of a computer the common script interface issuing a command to start a script execution thread for supporting execution of a script, receiving publication of a status of the executing script and providing the published status to a Web server when the Web server polls the common script interface for the status of the executing script; and computer usable program code for receiving a script input request by the common script interface from the executing script in a Web page and also receiving by the common script interface a subscription to the script input request from the Web server, the subscription by the Web server causing the Web server to perform formatting of the script input request from the executing script into a Web form for the Web page by mapping the script input request to fields in the Web form, and providing the Web page to a content browser;

the common script interface thereafter providing an intermediary for processing script input from the Web page in the Web server by:

receiving form input in the Web form in the Web page from the content browser via the Web server without regard to a format expected by the executing script;

transforming the form input into script input in the format expected by the executing script; and, providing the script input to the executing script;

setting an autopage update feature of the Web page;

serving the Web page to the content browser; and, responsive to receiving an autopage update from the Web page subsequent to receiving the script input request from the executing script, formatting the script input request into the Web form for the Web page, disabling the autopage update feature of the Web page, and reserving the Web page to the content browser.

7. The computer program product of claim 6, further comprising:

computer usable program code for further receiving script status information from the executing script; and, computer usable program code for providing the script status information in a portion of a polling Web page.

* * * * *